United States Patent [19]
Keiner

[11] 3,820,143
[45] June 25, 1974

[54] SHUTTER COCKING AND FILM TRANSPORT MECHANISM FOR A ROLL FILM CAMERA

[75] Inventor: Heinz Keiner, Oberndorf, Germany

[73] Assignee: Firma Ernst Leitz GmbH, Wetzlar, Germany

[22] Filed: May 25, 1973

[21] Appl. No.: 364,147

[30] Foreign Application Priority Data
July 24, 1972 Germany............................ 2236255

[52] U.S. Cl. .........................................354/206
[51] Int. Cl. ............................................ G03b 19/04
[58] Field of Search ......................................... 95/31

[56] References Cited
UNITED STATES PATENTS
3,682,066  8/1972  Simon................................... 95/31

Primary Examiner—John M. Horan
Attorney, Agent, or Firm—Krafft & Wells

[57] ABSTRACT

Shutter cocking and film transport mechanism for a roll film camera wherein film cartridges are particularly used, and wherein the film transport is effected with the advance and return strokes of a reciprocating operating slide, the improvement comprising a portion of the shutter cocking and film transport mechanism being used for the film transport consisting of an operating slide (1) traversing a constant path, which is accessible to the user, and a drive element (14) traversing paths of different lengths; and a resilient compensating member (15) is provided between the operating slide (1) and the drive element (14). The compensating member maintains both parts at a distance and bridges their path differences resulting from the increase in diameter of the wound-up film.

5 Claims, 3 Drawing Figures

SHUTTER COCKING AND FILM TRANSPORT MECHANISM FOR A ROLL FILM CAMERA

BACKGROUND OF THE INVENTION

The field of the invention is roll holders for different sized films used in photographic cameras.

The invention is particularly concerned with a shutter cocking and film transport mechanism for a roll film camera, wherein film cartridges are particularly employed, and wherein a perforation hole is associated with each frame in the film, and a locking pin engages this hole at the correct position of the frame in the picture gate.

According to West German Pat. No. 1,253,039 of Joachim Mädge, having a publication date of Oct. 26, 1967, a reciprocating operating slide is disclosed, by means of which a camera shutter is cocked and the film is transported. The forward as well as the return stroke of the slide is used by way of coupling elements connected with the slide.

In order to provide an improved force distribution and a more rapid further advancement by means of the operating slide, it has also been suggested in such cameras to place a uniform load on the forward stroke and on the return stroke of the operating slide.

Furthermore, it is conventional to provide the shifting means cooperating with the operating slide for film transport purposes with a clutch or differential gearing, in order to maintain the operating stroke of the operating slide at an equal size during all transport strokes. Without such a differential gearing, the operating stroke of the slide would vary constantly, because the slide is in direct gear connection with the take-up spool of the film, and this take-up spool executes an ever decreasing rotation per transport stroke with increasing diameter of the roll of film.

Clutches and differential gears, for obtaining a constant operating stroke per length of film transported, are complicated and are too expensive for use in such a camera.

SUMMARY OF THE INVENTION

Having in mind the limitations of the prior art, it is an object of the present invention to provide the shutter cocking and film transport mechanism with means which can be simply manufactured and easily installed, which means ensure a constant length of the advance and return strokes of the operating slide and without regard to the winding diameter of the take-up spool.

According to the present invention, this object is achieved, in a shutter cocking and film transport mechanism for a roll film camera, wherein film cartridges are particularly used and wherein the film transport is effected with the advance stroke and return stroke of a reciprocating operating slide, by providing that the part of the shutter cocking and film transport mechanism used for the film transport consists of an operating slide traversing a constant path. This operating slide is accessible to the user, and a drive element traverses different path lengths and a resilient compensating member is provided between the operating slide and the drive element. This member maintains a distance between the two parts and bridges the difference in the path thereof, which is produced with increasing diameter of the reeled-up film.

Furthermore, the present invention provides cooperation between the drive element, via suitable coupling means, with a gear wheel of the camera driving the film take-up spool.

It is advantageous, in this connection, to equip, as provided for in the present invention, the drive element with a serrated border which meshes with the gear wheel driving the film take-up spool of the cartridge.

It is furthermore suggested by the present invention that the spring means which provides the distance between the operating slide and the drive element is a compression spring.

BRIEF DESCRIPTION OF THE DRAWINGS

The invention is explained hereinbelow in greater detail with reference to a specific embodiment. The drawings appended hereto show the following.

DESCRIPTION OF THE PREFERRED EMBODIMENTS

Figure 1:
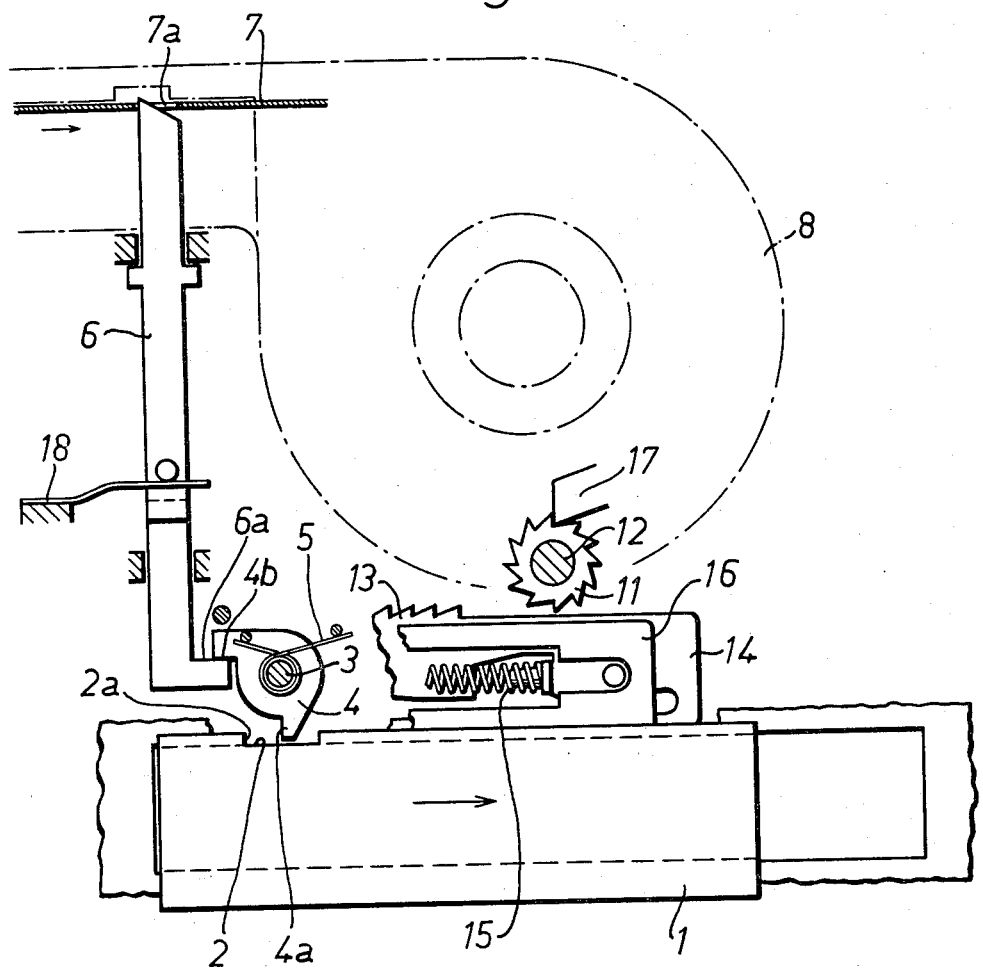
FIG. 1 is a schematic representation of an operating slide in a plan view.

In FIG. 1, an operating slide 1 of a roll film camera not shown in detail, wherein film cartridges are particularly employed, is provided with a cutout 2 in which a right angled lever 4 mounted on a shaft 3 is engaged. This lever, in turn, cooperates with a locking slide 6 during the shifting movement of the operating slide 1.

Figure 3:
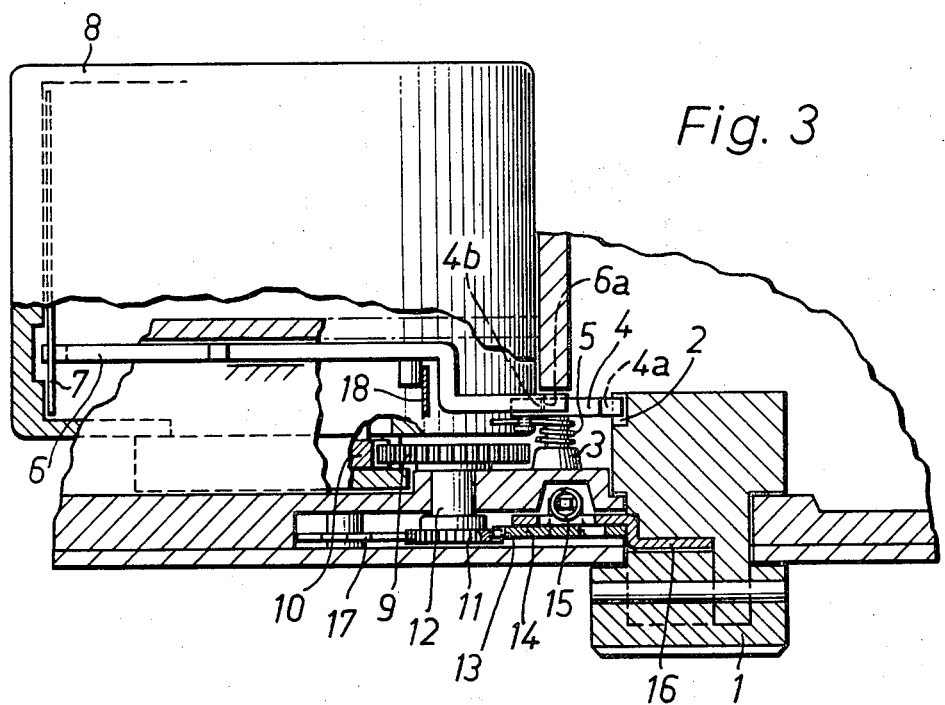
FIG. 3 shows a section through FIG. 2 along line III-—III in a lateral view.

A gear wheel 9, as shown in FIG. 3, is provided in the camera for the transport of a film 7. This gear wheel engages a film take-up spool 10 of a film cartridge 8 and is mounted, together with a further gear wheel 11, on a common shaft 12.

A serrated border 13 of a freely movable and resilient profiled member 14 meshes with the gear wheel 11. This part 14 is connected with a further profiled member 16 and is held at a distance therefrom by a compression spring 15. The profiled members 14 and 16, joined by the compression spring 15, form a compensating member which is entrained by the operating slide 1 during its film transport and shutter cocking movement. This is due to the fixed connection between the profiled member 16 and the operating slide. This compensating member ensures, with an increasing diameter of the reeled-up film, an equally large advance and return stroke of the operating slide 1.

A ratchet 17 engaging the gear wheel 11, permits the driving of the film in one direction only.

The film transport is effected as follows. When the operating slide 1 is actuated in the direction of the arrow (FIG. 1), edge 2a of the cutout 2 first engages a leg 4a of the angled lever 4 and moves the same against the force of a spring clip 5. During this step, leg 4b of the angled lever 4 presses against angled surface 6a of the locking slide 6 and pulls the same out of perforation 7a of film 7 and thus releases the latter to be transported out of the film cartridge 8.

Figure 2:
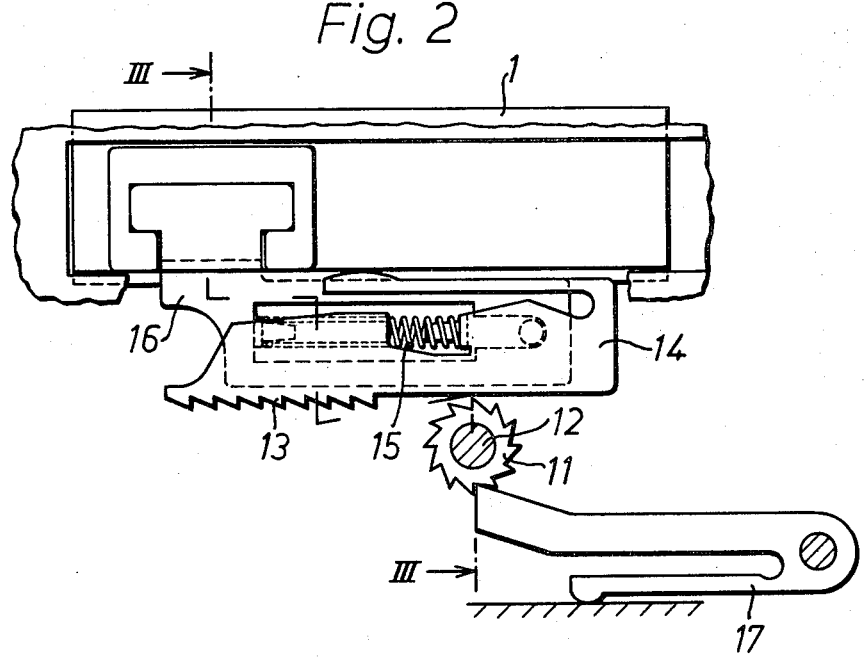
FIG. 2 is a schematic representation of an operating slide with compensating member in a plan view.

Upon the further shifting of the operating slide 1, the serrated border 13 of the shaped member 14 engages the gear wheel 11, after a predetermined advancement required for releasing the film as described above, and thus transports the film 7 from a film storage reel of the film cartridge 8 to its film take-up reel which is not shown in detail (FIGS. 2 and 3). This step is executed via the gear wheel 9 mounted with the gear wheel 11 on the common shaft 12 which is in engagement with the film take-up spool 10 of the film cartridge 8.

During the film transport operation, the locking slide 6, being disengaged from the angled lever 4 after the beginning of the film transport, slides along the film. When the subsequent perforated hole 7a is reached, which determines the frame spacing, the locking slide 6, moved by leaf spring 18, engages this hole and arrests the film 7, as well as the gear wheels 9 and 11 (FIG. 1).

Simultaneously, the ratchet gear 17 engages the gear wheel 11. Thereby, the gear wheels 9 and 11 are blocked against unintended backward movement (FIGS. 1 and 2).

Since the frame spacing is determined by the perforated holes 7a, the transport stroke of the operating slide 1 would become smaller due to the windup diameter which increases from frame to frame. The compensating member 14-16 counteracts this disadvantage.

By arresting the film 7, as well as the gear wheels 9 and 11, the profiled member 14 cooperating with the gear wheel 11 is likewise brought to a standstill. The operating slide 1 fixedly joined to the profiled member 16, however, can still execute its motion into the terminal position, since the further stroke is absorbed by compressing compression spring 15 and thus the compensation takes place.

By the resilient construction of the profiled member 14, the serrated edge 13 is disengaged from the gear wheel 11 during the return stroke of the operating slide 1 and returns while ratchetting over the teeth of gear wheel 11.

At the same time, during the return stroke of the operating lever 1, the angled lever 4 is returned to its initial position.

I claim:

1. In a photographic camera having a roll holder for films, said roll holder being drivingly engaged by gearing means, actuated by means of a reciprocating operating slide which transports the film by advance and return strokes and cocks the shutter, the improvement comprises a shaped member (14) having a serrated outer edge (13) for driving said gearing means, said operating slide having a given path length, said shaped member travelling through a path different in length from said path of said operating slide, and resilient compensating means (15) connecting said operating slide and said shaped member to maintain said operating slide and said shaped member at a distance from one another and bridging their path difference resulting from the increase in diameter of said film (7) as it is rolled on said roll holder.

2. The photographic camera of claim 1, wherein said resilient compensating means is a compression spring (15).

3. The photographic camera of claim 2, wherein said means for driving said roll holder is a first shaped member (14) having a serrated outer edge (13), a second profiled drive element (16) is attached to said operating slide and said first end of the compression spring is connected to said first shaped member and said second end is connected to said second profiled drive element.

4. The photographic camera of claim 1, wherein said gearing means comprises a first and a second gear wheel (11 and 9) mounted on a common shaft (12), and wherein said serrated edge meshes with said first gear wheel and said second gear wheel drives said roll holder.

5. The photographic camera of claim 1, wherein a ratchet (17) engages said first gear wheel to maintain the direction of revolution of said roll holder in a single direction.

* * * * *